US008521902B2

(12) United States Patent
Russo et al.

(10) Patent No.: US 8,521,902 B2
(45) Date of Patent: Aug. 27, 2013

(54) SHARED BUFFER FOR CONNECTIONLESS TRANSFER PROTOCOLS (75) Inventors: Richard T. Russo, Redmond, WA (US); Aaron Matthew Tyler, Redmond, WA (US); Chandan Rama Reddy, Redmond, WA (US); Manoj Krishna Ghosh, Redmond, WA (US); Alaa H. Abdelhalim, Bellevue, WA (US); Roger D. Seielstad, Redmond, WA (US); Peter A. Gurevich, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 173 days.

(21) Appl. No.: 12/959,245

(22) Filed: Dec. 2, 2010

(65) Prior Publication Data

US 2012/0144060 A1    Jun. 7, 2012

(51) Int. Cl.
G06F 15/16 (2006.01)

(52) U.S. Cl.
USPC ........................................................ 709/234

(58) Field of Classification Search
USPC ........................................................ 709/234
See application file for complete search history.

(56) References Cited

U.S. PATENT DOCUMENTS

| | | | |
|---|---|---|---|
| 4,736,369 A | 4/1988 | Barzilai | |
| 5,163,046 A | 11/1992 | Hahne | |
| 6,185,678 B1 | 2/2001 | Arbaugh et al. | |
| 6,901,593 B2 | 5/2005 | Aweya et al. | |
| 7,133,362 B2 | 11/2006 | Chu | |
| 7,245,586 B2 | 7/2007 | Bitar | |
| 7,246,171 B1 | 7/2007 | Ambrose | |
| 7,570,584 B1 | 8/2009 | Daley | |
| 2003/0088667 A1* | 5/2003 | Riedle | 709/224 |
| 2004/0003104 A1* | 1/2004 | Boskovic et al. | 709/231 |
| 2004/0267716 A1 | 12/2004 | Prabu et al. | |
| 2005/0005024 A1 | 1/2005 | Samuels | |
| 2005/0177625 A1 | 8/2005 | Paek | |
| 2008/0250155 A1 | 10/2008 | Wang | |
| 2009/0006642 A1* | 1/2009 | Dickens et al. | 709/231 |
| 2009/0207848 A1* | 8/2009 | Kwan et al. | 370/397 |
| 2009/0259809 A1* | 10/2009 | Hung | 711/105 |
| 2010/0011203 A1* | 1/2010 | Dickens et al. | 713/2 |
| 2010/0217889 A1 | 8/2010 | Simcoe | |
| 2012/0143993 A1 | 6/2012 | Russo et al. | |

OTHER PUBLICATIONS

Sollins, K , RFC 1350 The TFTP protocol ( revision 2), Jul. 1992.*

(Continued)

*Primary Examiner* — Shirley Zhang
*Assistant Examiner* — Zakaria Zouaki
(74) *Attorney, Agent, or Firm* — Chin IP, PLLC; Davin Chin (57) ABSTRACT Described herein are various principles for operating a connectionless content unit transfer protocol to transmit content of a content unit to multiple clients using a shared buffer. A server may transfer content of one or more content units to each of multiple clients upon request from the client using individual buffers. For each content unit being transferred, the server may maintain a count of the aggregate size of buffers for transferring content of that content unit. If the server determines that the aggregate size of the buffers transmitting a particular content unit is larger than the content unit itself, the server may establish a shared buffer for transferring that content unit to clients. A server using a shared buffer in this manner may transfer content of the content unit to clients using the shared buffer until all requesting clients have received the content unit.

18 Claims, 6 Drawing Sheets

(56) References Cited

OTHER PUBLICATIONS

Cisco Documentation, http://docstore.mik.ua/univercd/cc/td/doc/product/iaabu/cddm/cddm111/adguide/tftp.htm, 1997.*

Wollman, W, et al, RFC 1986, Enchanced trivial File Transfer Protocol, 1986.*

Yao, S. et al. "Electrical ingress buffering and traffic aggregation for optical packet switching and their effect on TCP-level performance in optical mesh networks" IEEE Communications Magazine, Sep. 2002.

"Extending TFTP," available at: http://www.compuphase.com/tftp.htm, 2010, updated Mar. 9, 2010. Retrieved Aug. 30, 2010.

"PacketTrap TFTP Server," available at: http://www.tftp.co.uk/. Retrieved Aug. 30, 2010.

"How the PXE Server Works," available at: http://technet.microsoft.com/en-us/library/cc732649(WS.10).aspx, updated May 8, 2008. Retrieved Aug. 30, 2010.

Velten, D. et al.; RFC-908 "Reliable Data Protocol;" Jul. 1984; BBN Communications Corporation; 63 pages.

Partridge, C. et al.; RFC-1151 "Version 2 of the Reliable Data Protocol (RDP);" Apr. 1990; BBN Communications Corporation; 5 pages.

Schulzrinne, H. et al.; RFC-3550 "RTP: A Transport Protocol for Real-Time Applications;" Jul. 2003; The Internet Society; 89 pages.

Non-Final Office Action mailed Aug. 16, 2012 in U.S. Appl. No. 12/959,233; 20 pages.

Malkin, G. et al.; RFC2347 "TFTP Option Extension;" May 1998; Internet Engineering Task Force; 5 pages.

Malkin, G. et al.; RFC2348 "TFTP Blocksize Option;" May 1998; Internet Engineering Task Force; 4 pages.

Biswas, Anumita; "Enhancing TCP Performance Through the Large Window and SACK Options;" Dec. 1, 2002; Novell, Inc.; 6 pages.

Final Office Action mailed Apr. 25, 2013 in U.S. Appl. No. 12/959,233; 19 pages.

* cited by examiner

SHARED BUFFER FOR CONNECTIONLESS TRANSFER PROTOCOLS

BACKGROUND

Various types of protocols have been created for exchanging information via computer communication networks. Among these types of protocols are file transfer protocols. A file transfer protocol is adapted to copy a particular file of a file system from a source (also called a server) to a destination (also called a client).

Multiple file transfer protocols have been developed with various different characteristics, each of which may be suitable for particular computing or network environments. One popular file transfer protocol is simply called the File Transfer Protocol (FTP). FTP operates using the Transmission Control Protocol (TCP), which provides connections and other functionality enabling reliable transfer between computing devices. On top of the reliability offered by TCP, FTP can offer other functionality to ensure secure transfer and listing of files available for transfer.

Because of the functionality of FTP, programs that implement the protocol can require a great deal of resources from the devices running them. For example, programs that implement the protocol can take up a lot of space to store or a lot of processing time to run. Additionally, a device running such a program may need other software, like drivers and libraries, that implement other functionality needed by FTP, including software that implements TCP. In some cases, a computing device that a user wishes to use to exchange files may not have such resources or software. The computing device may not have access to a large amount of memory or processing resources, or may not have other software that implements TCP or other functionality.

In such cases, other file transfer protocols may be used. For example, the Trivial File Transfer Protocol (TFTP) may be used. TFTP operates using the User Datagram Protocol (UDP), which is a connectionless communication protocol that does not include functionality for reliable transmission. TFTP also does not include any functionality for authentication of users or security and normally does not include congestion control techniques. As a result, TFTP can be implemented with very little storage space, very little processing resources, and very little reliance on other software.

SUMMARY

TFTP is well-developed for situations where there are limited resources available for implementing a transfer protocol, as TFTP is designed to use few resources while transferring content. However, TFTP sometimes uses resources in a way that consumes more than is otherwise necessary or efficient. For example, TFTP servers are adapted to create, for each client session to which a file is being transferred, a buffer to store content to be transmitted to the client. A TFTP server may use a great deal of memory and processing resources maintaining the buffers for each client session when transferring files to multiple clients. In some situations, however, a TFTP server may be able to use less memory by not using a buffer for each client. This may be the case where multiple clients are requesting a same file and the file could instead be buffered once for each of the client sessions.

Described herein are various principles for operating a connectionless content unit transfer protocol (also more simply called a connectionless transfer protocol herein) to transmit content of a content unit to multiple clients using a shared buffer. In some embodiments, a server may transfer, using individual buffers for each client, content of one or more content units to each of multiple clients upon request from the client. The server may also, for each content unit being transferred, maintain a count of the aggregate size of buffers for transferring content of that content unit. If the server determines that the aggregate size of the buffers transmitting a particular content unit is larger than the content unit itself, then the server may establish a shared buffer for transferring content of that content unit to clients requesting the content unit.

In some embodiments, a server using a shared buffer in this manner may transfer content of the content unit to clients using the shared buffer until all requesting clients have received the content unit. The server may, in some cases, delay for some time and use the shared buffer if any new requests for the content unit are received from other clients during that time. If no requests are received during that time, the shared buffer may be deleted from memory. Later, if a new request is received from one or more clients, the server may establish individual buffers for each client and again maintain a count of the aggregate size of the buffers to determine whether to establish a shared buffer.

The transferring from individual buffers and/or from shared buffers may be carried out using a connectionless content unit transfer protocol. Connectionless content unit transfer protocols include connectionless file transfer protocols, including TFTP. Therefore, some embodiments may operate with TFTP, but embodiments are not limited to operating with TFTP.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Connectionless content unit transfer protocols (also simply called connectionless transfer protocols herein), including the Trivial File Transfer Protocol (TFTP), are used in a variety of environments. For example, TFTP may be used in installing operating systems remotely.

In many cases, installing an operating system on a computing device requires a user to directly, manually operate that computing device to copy the operating system from a disc available locally, on the computing device. Such copying from a local disc can include copying from a Compact Disc (CD) or Digital Versatile Disc (DVD) being read by a component of the computing device. Such copying requires a user to visit the computing device to perform the installation, such that the disc (e.g., the CD) can be inserted into the computing device. Visiting the computing device may be difficult or burdensome in some cases, though. For example, if a user is a network administrator responsible for a network with many computing devices, visiting each computing device individually to install the operating system could take a great deal of time. As a result, some services have been created for remotely installing an operating system via a network. For example, the Windows® Deployment Services (WDS), available from the Microsoft Corporation of Redmond Wash., may be used to install an operating system over a computer communication network. In a WDS installation, a computing device on which an operating system is to be installed is operated in a limited-resource state, such as in the Preboot Execution Environment (PXE). When operated in PXE, there may be limited software available on the computing device for execution and some resources and devices may not be available on the computing device. In particular, software implementing protocols like TCP may not be available and many processing and memory resources of the computing devices may not be available. In some such limited-resource states, however, the computing device may include a TFTP client that is able to receive information communicated from a TFTP server. In this case, the TFTP server may have a copy of the operating system files or a disk image that includes operating system files and the TFTP server may transfer the file(s) using TFTP as part of installing the operating system.

As TFTP is specially adapted for limited-resource environments, TFTP is adapted to use limited resources. When file is to be transferred from a server to a client using TFTP, the server will establish a buffer holding content to be transferred to the client. The buffer may be used to pre-retrieve content to be transmitted to the client, because retrieving content from disk may be a relatively slow process compared to retrieving content from the buffer. Therefore, while some content is being transmitted over the network (which is also a relatively slow process) content that will be transmitted may be retrieved from disk and placed in the buffer to be ready for transmission when the server is to transmit that content. By placing content in the buffer before the content is needed, rather than retrieving the content from disk when the content is needed, the server can quickly transmit content as soon as the server is ready to transmit the content, without waiting for slow processes like disk retrieval.

The buffer holds a portion of the file and as content is transferred to the client, the transferred content is removed from the buffer and new content of the file is added to the buffer to be transmitted. Additionally, as the content is transmitted the server manages timers that are used to determine whether transmitted content is lost. When a datagram is transmitted from the server to the client, the server starts a timer. If the timer expires before the server receives from the client an acknowledgement of proper receipt of the datagram, then the server assumes the datagram was lost and retransmits the datagram to the client.

Storing the buffer in memory uses memory resources of the server. Additionally, managing the buffer by deleting content from the buffer and adding new content to the buffer and managing the timers uses processing resources of the server. When there are few clients to which content units are being transmitted, the server may not be overburdened. However, when many clients are connecting, the server may become overwhelmed and the time for the server to complete operations may increase. The time for content units to be transferred to clients may correspondingly increase.

TFTP does not include functionality for remedying this overburdening of the server. As TFTP is designed to be a very simple process such that it uses little processing resources, software that implements TFTP typically does not evaluate whether other resources are being used effectively or whether resources could be used more effectively, so as to avoid using or wasting resources on such an evaluation. Instead, the software merely uses resources according to the established techniques for reducing an amount of resources consumed and does not make any effort toward efficient use. As a result, TFTP sometimes uses resources in a way that consumes more than is otherwise necessary or efficient.

In some situations, however, the server may be transmitting a same file to many clients. For example, in a WDS environment, the server may transmit the same operating system file to multiple clients. The buffers that are overburdening the server, therefore, may contain the same or similar content. Depending on a size of each buffer and a number of clients, the aggregate size of the buffers on the server may exceed the size of the actual operating system file being transferred to each of the clients. In this case, the server could reduce resources necessary for transferring the content unit to each of the clients by establishing a shared buffer from which to transmit content to each of the clients requesting that operating system file. If the shared buffer includes the entirety of the operating system file, then the server would not need to use any resources managing the buffer by adding and removing content from the buffer.

Described herein are various principles for operating a connectionless content unit transfer protocol (also more simply called a connectionless transfer protocol herein) to transmit content of a content unit to multiple clients using a shared buffer. In some embodiments, a server may transfer, using individual buffers for each client, content of one or more content units to each of multiple clients upon request from the client. The server may also, for each content unit being transferred, maintain a count of the aggregate size of buffers for transferring content of that content unit. If the server determines that the aggregate size of the buffers transmitting a particular content unit is larger than the content unit itself, then the server may establish a shared buffer for transferring content of that content unit to clients requesting the content unit.

In some embodiments, a server using a shared buffer in this manner may transfer content of the content unit to clients using the shared buffer until all requesting clients have received the content unit. The server may, in some cases, delay for some time and use the shared buffer if any new requests for the content unit are received from other clients during that time. If no requests are received during that time, the shared buffer may be deleted from memory. Later, if a new request is received from one or more clients, the server may establish individual buffers for each client and again maintain a count of the aggregate size of the buffers to determine whether to establish a shared buffer.

For ease of description, examples below are described in connection with the Trivial File Transfer Protocol (TFTP). Embodiments are not, however, limited to operating with TFTP. Other connectionless content unit transfer protocols may be operated with adaptive flow control techniques according to principles described herein. A content unit transfer protocol, as described herein, includes protocols adapted for transmitting a content unit from a server to a client. A content unit is an atomic unit of storage in a storage system, and content of the content unit may be transferred using the transfer protocol. Where a storage system is a file system, a content unit may be a file, and a content unit transfer protocol may be a file transfer protocol for transferring files. A connectionless transfer protocol maybe a content unit transfer protocol that does not establish a connection when transferring content. For example, some connectionless transfer protocols may transfer content using the User Datagram Protocol (UDP) that operates without connections. Some connectionless transfer protocols may also operate without functionality available in other transfer protocols that use more resources or, for example, use connections. For example, some connectionless transfer protocols may not use security features such as authentication or encryption, as these security features may use more resources than available. Additionally, some connectionless transfer protocols may operate without congestion detection techniques. As mentioned above, TFTP is one example of a connectionless content unit transfer protocol. Other protocols are possible, however.

Additionally, examples are given below of using TFTP in a process for installing operating systems over a network using WDS. Embodiments are not limited to operating with connectionless transfer protocols that exchange operating system information or files, or to being used with WDS. Rather, connectionless transfer protocols that use flow control techniques according to principles described herein may exchange any suitable type of content.

Figure 1:
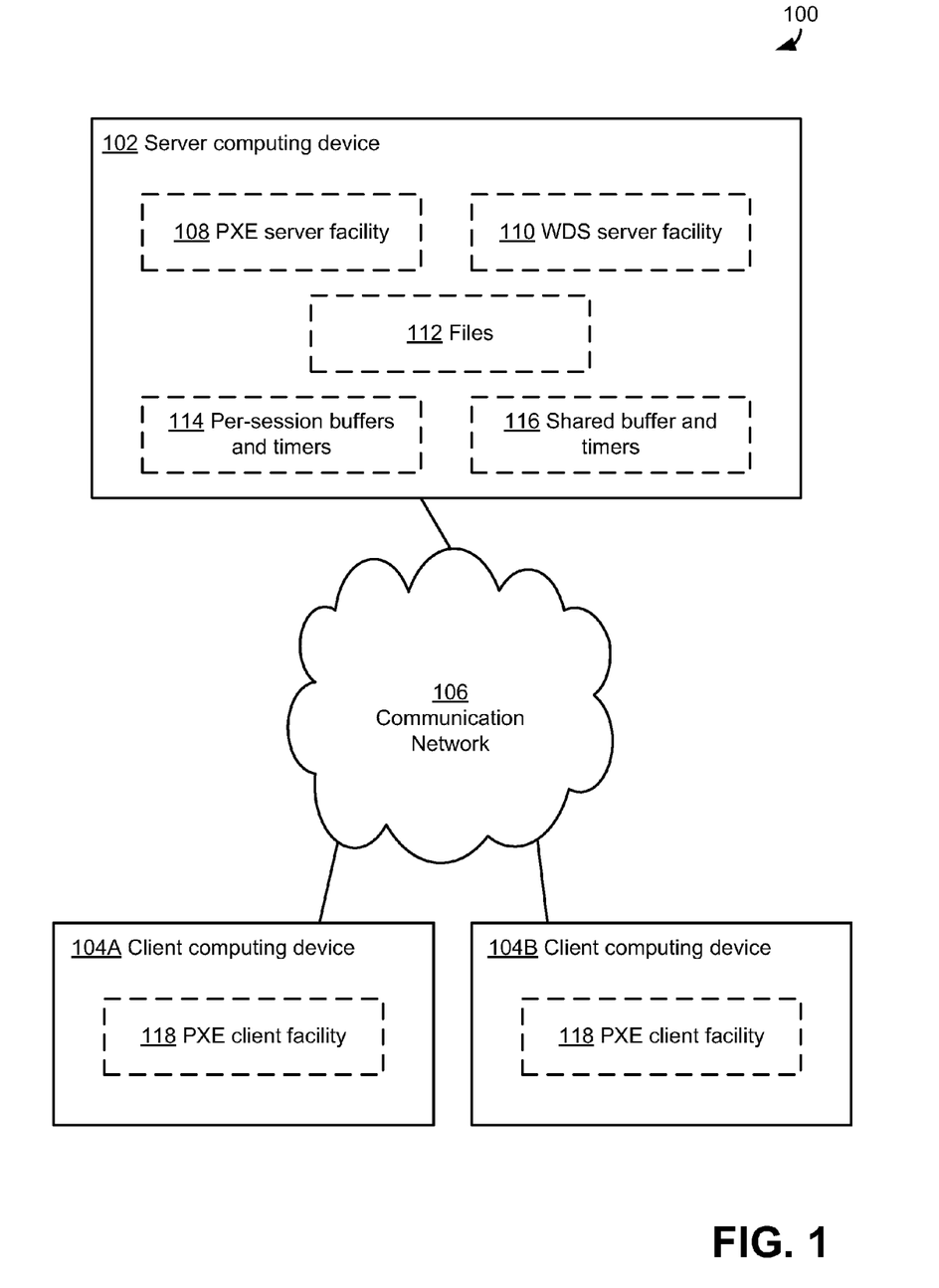
FIG. 1 is a block diagram of one exemplary computer system in which some embodiments may operate.

FIG. 1 illustrates one exemplary environment in which some embodiments of principles described herein may operate. The exemplary environment 100 of FIG. 1 includes a server computing device 102 and two client computing devices 104A, 104B that are connected via any suitable wired and/or wireless communication network 106. The server 102 and the clients 104A, 104B may communicate via the network 106 as part of a WDS process to install an operating system on the clients 104A, 104B. The server 102 and clients 104A, 104B therefore each include various components to be used in exchanging content related to WDS and carrying out WDS properties. Among these components are functional facilities that implement a connectionless transfer protocol like TFTP for communicating content units between the server 102 and the clients 104A, 104B.

The server 102 includes a PXE server facility 108 and a WDS server facility 110 that may operate according to the WDS protocol for distributing operating system components. The operating system components, such as a network bootstrap program (NBP), which is a known component of the WDS process, and an image for the operating system to be installed, may be stored as files 112 that are accessible to the server 102. The files 112 may be stored in a storage that is a part of the server 102 or may be accessible to the server 102 in any other way, including stored on another computing device available via the network 106. Each client 104A, 104B includes a PXE client facility 118 that may interact with the PXE server facility 108 and the WDS server facility 110 to launch an installation process using WDS.

When the server 102 and clients 104A, 104B communicate to exchange files using WDS, a connectionless transfer protocol like TFTP may be used to exchange files between the server 102 and the clients 104A, 104B. In accordance with techniques described herein, the server 102 may initially establish buffers and timers 114 to be used for transferring content to each client 104A, 104B. Clients, including the clients 104A, 104B, may be requesting from the server 102 the same or different files and therefore the buffers 114 may include content of the same file or different files. In the WDS example of FIG. 1, both of the clients 104A, 104B request that the NBP or an operating system image be transmitted to the clients 104A, 104B. As discussed above, for each client 104A, 104B content is transferred from the corresponding buffer 114 and a timer is maintained to determine whether transmitted datagrams were lost.

During the transfer to the clients 104A, 104B from the individual buffers 114, a facility of the server 102 performing the transfer, such as the PXE server facility 108 or the WDS server facility 110, may monitor the buffers 114 and maintain an aggregate size for each file for which content was requested. This may be the case when the NBP or operating system image is transmitted to clients 104A, 104B. For example, the NBP could be a 150 megabyte file. If each of the individual buffers is 2 megabytes, and the file is being transmitted to 76 clients, then the server may maintain 76 individual buffers that have an aggregate size of 152 megabytes. It should be appreciated, of course, that these numbers are merely illustrative and that embodiments may operate with buffers of any suitable size (including fixed or varying, or different between clients) and files or other content units of any suitable size.

When, for each particular file being transmitted, the aggregate size of the buffers 114 exceeds the size of the particular file, a shared buffer 116 may be established for the particular file. Once the shared buffer 116 is established, content may then be transmitted from the shared buffer 116 to each of the clients 104A, 104B. A shared timer object may also be used for transmitting content from the shared buffer to each client. The shared timer object may maintain timers for each of the clients to which content is transmitted from the shared buffer, such that a determination may be made for each client regarding whether content is lost without executing different processes or using different object. This could reduce the resources used on the server 102 for monitoring timers and determining whether datagrams were lost.

In some embodiments, after the server 102 begins using the shared buffer 116 to transmit content to clients 104A, 104B, the server 102 may monitor sessions for transferring content of the file that is buffered in the shared buffer 116 to determine whether to stop using the shared buffer 116. The server 102 may stop using the shared buffer 102 when one or more conditions are met. For example, the server 102 may cease using the shared buffer 116 when the shared buffer 116 is not an efficient use of resources or not more efficient than alternatives. This may be the case when a number of clients to which the file is being transferred is below a threshold, such that an aggregate size of individual buffers for each of the clients would be less than the size of the file being transferred. As another example, the server 102 may cease using the shared buffer 116 when the file is being transferred to less than or equal to than a threshold number of clients. When the threshold number is zero, the server 102 may cease using the shared buffer 116 when the server 102 is no longer transferring the file to clients. When the server 102 stops using the shared buffer 116, content may be transferred from individual buffers 114 for each client unless and until the server 102 determines again that the aggregate size of the buffers 114 for one file is greater than the size of the one file.

In some embodiments, the one or more conditions by which the server 102 determines whether to stop using the shared buffer 116 includes a timing condition. For example, if the server 102 determines that other conditions are met, such as that no more clients are requesting or receiving content of the file, the server 102 may wait some period of time. During the waiting period, the server 102 may determine whether any conditions have changed such that the server 102 should continue using the shared buffer 116. In some embodiments, the server 102 may monitor for whether any requests for new transfers of the file have been received during that time. If conditions change during the waiting period (e.g., if a new request is received) then the server 102 may continue using the shared buffer 116. As another example, the server 102 may determine whether to stop using the shared buffer 116 based on a total size of buffers maintained by the server 102. If the server 102 is using a lot of memory to maintain one or more buffers (including shared buffers), then the server 102 may stop using one or more buffers faster than the server 102 otherwise might, such that memory resources may be made available on the server 102. In some embodiments that determine whether to stop using the shared buffer 116 based at least in part on a total size of buffers, the server 102 may compare an amount of memory allocated to one or more buffers to a threshold and, if the amount of memory exceeds the threshold, stop using the shared buffer 116. In some such embodiments, the server 102 may make the determination about the amount of memory when there are no more clients requesting or receiving content of a file buffered in a shared buffer, while in other embodiments the determination may be made at any suitable time.

Examples of ways in which some of the principles described herein may be implemented and environments in which they may be used were described generally above in connection with FIG. 1. Other examples are provided below of more detailed ways in which these principles may be implemented. Embodiments are not, however, limited to implementing any of the techniques described below and may implement none, some, or all of these techniques. Additionally, as discussed above, the examples below will be discussed in terms of transferring files using TFTP and some examples are described in the context of WDS. Embodiments not limited, however, to exchanging files, using TFTP, or being used with WDS.

Additionally, for ease of description in the examples below, various actions are described as being carried out by a server. It should be appreciated that actions below may be carried out by a server according to instructions of any suitable functionality facility, including a functional facility including functionality for performing a transfer according to a connectionless transfer protocol like TFTP and/or functionality for performing WDS operations.

Figure 2:
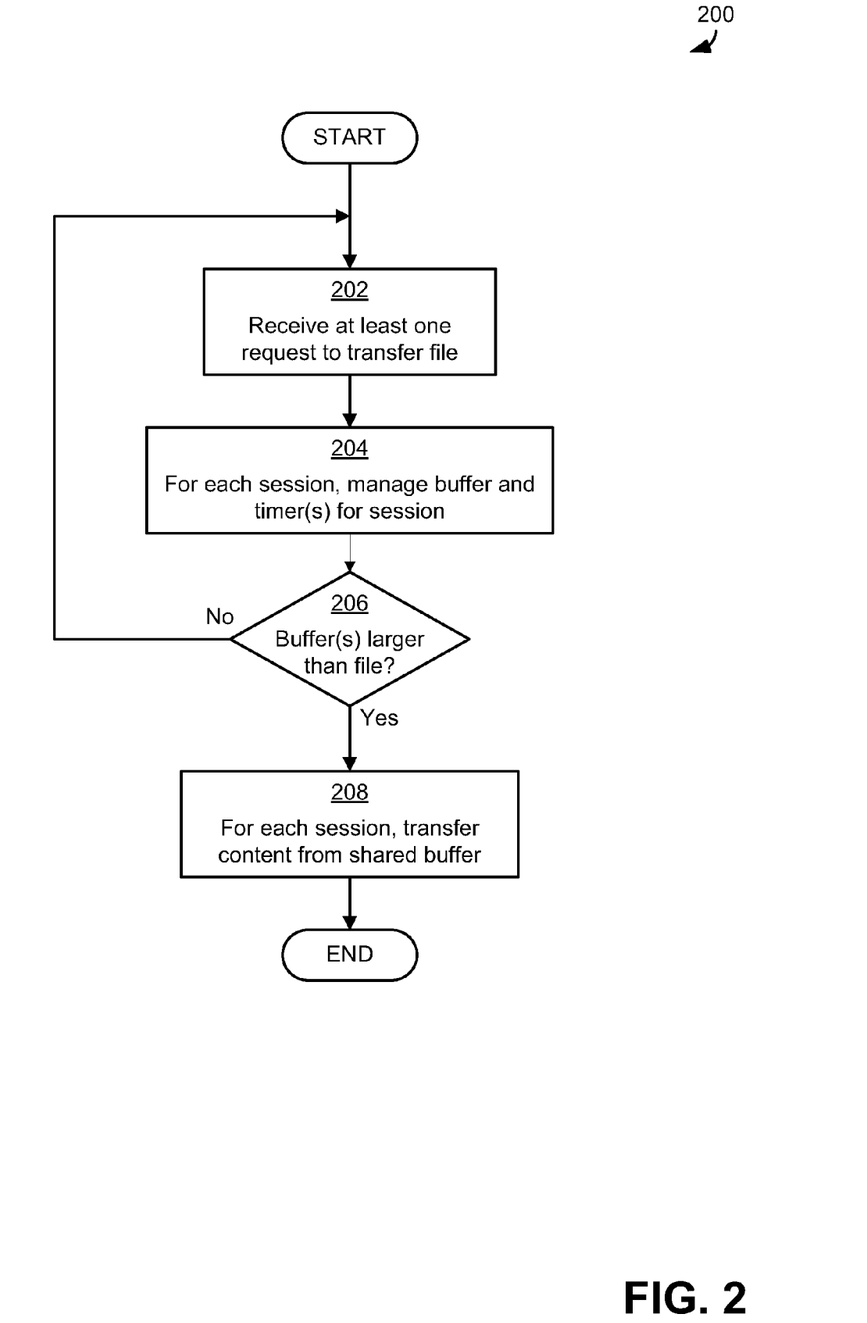
FIG. 2 is a flowchart of one exemplary process for determining whether to use a shared buffer for transferring content of a particular content unit to one or more clients requesting that the particular content unit be transferred.

FIG. 2 illustrates one exemplary process that may be used in some embodiments for determining whether to use individual buffers or a shared buffer to transfer content of a file to multiple clients. In environments in which the process 200 of FIG. 2 may be used, multiple clients may be connecting to a server to request transfer of files using TFTP. The clients may be requesting a same file or different files. In some cases, at least a portion of the clients may be requesting the same file. For each file that is being transferred by the server, the server may carry out the process 200 to determine whether to use individual buffers or a shared buffer for that file.

The process 200 begins in block 202, in which the server receives, from one or more clients, requests to transfer a particular file to the clients. In block 204, the server begins transferring content of the file to the clients using individual buffers and using individual timers for each client. As content is transferred to a client from a buffer, the server removes successfully transferred content from the buffer and adds new content to the buffer, such that the buffer contains content to be transmitted to the client. Additionally, the server monitors a timer associated with the client to determine whether, for any datagram transmitted to the client, an acknowledgement of proper receipt has not been received by the server before the timer expires. Additionally, in block 206 the server may delete individual buffers and timers when a file is fully transmitted to a client or the transfer is terminated for any reason.

Using individual buffers and individual timers for each client may not be an efficient or desirable use of resources in some situations. The server is adapted to determine whether to use a shared buffer instead of individual buffers when doing so would be efficient or desirable. To accomplish this, in some embodiments the server may maintain a count of an aggregate size of the individual buffers used to transfer the file to each client. The aggregate size is the sum of the sizes of individual buffers, which is the total memory used for buffering the file. This count may be maintained for each file being transferred to clients. In block 206 of FIG. 2, for a particular file, the server determines whether the aggregate size of the buffers used in block 204 for transferring the particular file is larger than the file to be transferred. If the aggregate size of the buffers is larger than the file itself, then it may be more efficient or desirable to buffer the file in a shared buffer rather than use individual buffers.

If the server determines in block 206 that the aggregate size is not larger than the total file size, then the server continues back to block 202 to receive requests and, in block 204, transfer content from individual buffers.

If, however, the server determines in block 206 that the aggregate size is larger than the total file size, then the server continues to block 208 to transfer content to the clients from a shared buffer. In block 208, for multiple clients remaining to receive content of the file and/or for new request received for that file, content may be transferred from a shared buffer rather than from individual buffers for each client as in block 204. In some embodiments, a single shared buffer may be used for each client remaining to receive content of the file and for each new client requesting content of the file. In other embodiments, however, other shared buffers may be used. For example, a single shared buffer may be used for each client remaining to receive content of the file and individual buffers may be used for new clients, or a single shared buffer may be used for new clients but individual buffers may be used for clients remaining to receive content of the file, or multiple shared buffers may be used. Embodiments are not limited to using any particular type or number of shared buffer.

To transfer content to clients in block 208, the server may maintain for each client session information identifying content that has been transmitted and a timer that may be used to identify whether transmitted datagrams have been lost. When a datagram is to be transmitted, content of the file for the datagram is retrieved from the shared buffer and transmitted to the client and the timer is started. When an acknowledgement for that datagram is received, the server may update the session information for that client to identify that content was successfully transmitted and may retrieve from the shared buffer content not yet transmitted and transmit that content in another datagram. In some embodiments, this process may continue until the client has received all of the content of the file.

Once the server begins transmitting the content from the shared buffer in block 208, the process 200 ends.

When a server determines that a shared buffer should be used, the server may establish the shared buffer in any suitable manner. In some embodiments, the server may create a new buffer and immediately populate the buffer with all of the content of the file for which the shared buffer was created. In other embodiments, however, a transition may be carried out from individual buffers to shared buffers. During such a transition, the shared buffer may be populated with content of the file as the content is transmitted to clients using the individual buffers. During the transition, content may be removed from the individual buffers as the content is transmitted, until only the shared buffer remains on the server for that file.

Figure 3:
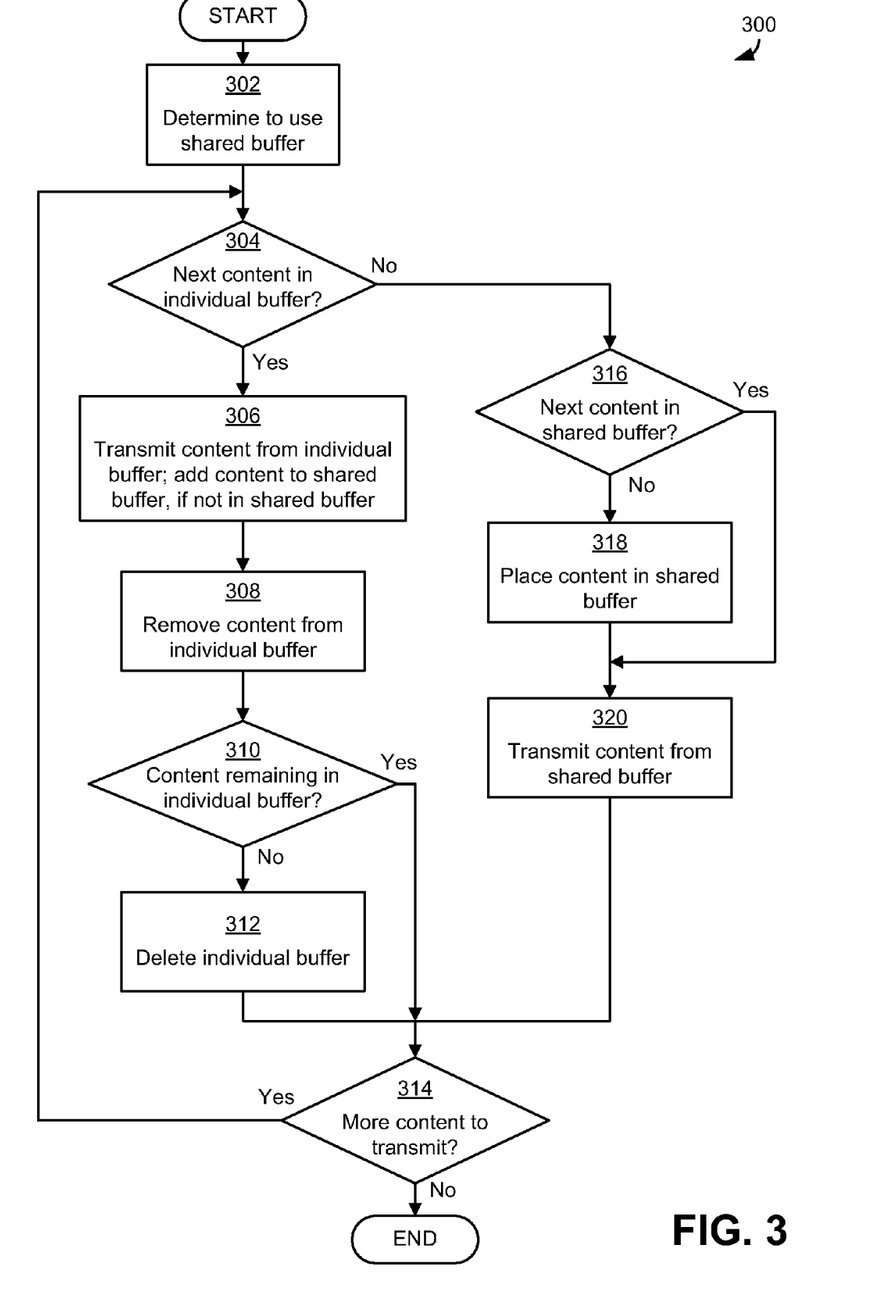
FIG. 3 is a flowchart of one exemplary process for transitioning from using individual buffers for transferring content of a content unit to a client to using a shared buffer.

FIG. 3 illustrates one example of a process that may be used in some embodiments to transition a server from individual buffers to a shared buffer for a file. The process 300 may be carried out by the server for each client to which content of the file is to be transmitted and to which the server was already transmitting content using an individual buffer.

Process 300 of FIG. 3 begins in block 302 in which a server determines to use a shared buffer to transmit content of a file. Following block 302, the server may transition to transmitting content using the shared buffer by, during a transition period, transmitting content to the client using both the existing individual buffer and the new shared buffer.

In block 304, a loop is started for the next content of the file, not yet transmitted to the client, that will be transmitted. In block 304, the server determines whether the next content is in the individual buffer for the client. If so, then in block 306 the next content is retrieved from the individual buffer and transmitted to the client. Additionally, in block 306, the next content is added to the shared buffer if the next content is not yet in the shared buffer. In some cases, the next content may have been added to the shared buffer by the server in response to transmitting the next content to another client, so the content should only be added to the shared buffer when the next content was not previously added. In block 308, once the content is successfully transmitted to the client, the next content is removed from the individual buffer. In some cases, the next content may be removed from the individual buffer upon receiving an acknowledgement from the client, such that the next content can be transmitted from the individual buffer again if no acknowledgement is received, while in other cases the next content is removed upon transmission. In these other cases, if retransmission of the content is necessary, the next content can be retransmitted from the shared buffer.

In block 310, after the next content is removed from the individual buffer, the server determines whether any content remains in the individual buffer for the client. If no content remains in the individual buffer, then in block 312 the individual buffer and any memory associated with it is deleted and deallocated, such that the individual buffer is removed from the system. Deleting the buffer in block 312 ensures that when resources are allocated to the shared buffer, other resources are not still being used unnecessarily by the individual buffers.

After the individual buffer is deleted or if it is determined in block 310 that more content remains in the individual buffer, in block 314, the server determines whether any more content is to be transmitted to the client. If so, then the server returns to block 304 of process 300 and continues the loop to select next content to be transmitted and determine how to transmit the content.

As mentioned above, in block 304 a determination is made regarding whether the next content is in the individual buffer for the client. Described above are actions that can be taken by the server when the next content is in the individual buffer. If in block 304 the next content is determined not to be in the individual buffer, other actions can be taken.

In particular, when the server determines in block 304 that the next content is not in the individual buffer, the server determines in block 316 whether the next content is in the shared buffer. As discussed above, the server may have added the next content to the shared buffer when the content was transmitted to another client. If the next content is not in the shared buffer, then in block 318 the next content is retrieved from the original source of the file (e.g., retrieved from disk) and is placed in the shared buffer. In block 320, if the next content was in the shared buffer or after the next content is placed in the shared buffer, the next content is transmitted to the client from the shared buffer.

Once the next content is transmitted to the client in block 320, the server determines in block 314 whether more content is to be transmitted to the client. As discussed above, if more content is to be transmitted, the server continues the loop by returning to block 304 to select next content and determine how to transmit the next content.

If, however, no more content is to be transmitted to the client, then the process 300 ends.

As mentioned above, the process 300 can be used to transmit content to a client to which the server was already transmitting content when the server decided to use a shared buffer. For new clients that request the file after the decision is made to use a shared buffer, a different process may be used by which content is transmitted only from the shared buffer. Additionally, while the process 300 can be used until the server finishes transmitting content of the file to the client, in some embodiments a process similar to process 300 may be used that stops when the individual buffer is deleted. After the individual buffer is deleted, the server may simply transmit content from the shared buffer without first performing a check on whether the content is in the individual buffer.

Discussed above are illustrative techniques that may be used in some embodiments to determine whether to begin transmitting content of a file to multiple clients using a shared buffer. In some embodiments, a server may implement techniques to determine when to stop using a shared buffer and instead use individual buffers. This may be the case where, for example, using individual buffers may be more desirable or efficient than using a shared buffer. In some embodiments, for example, the server may stop using a shared buffer when an expected aggregate size of individual buffers would be less than the size of the file being transmitted and/or when a number of clients to which content of the file is being transmitted is less than a threshold.

Figure 4:
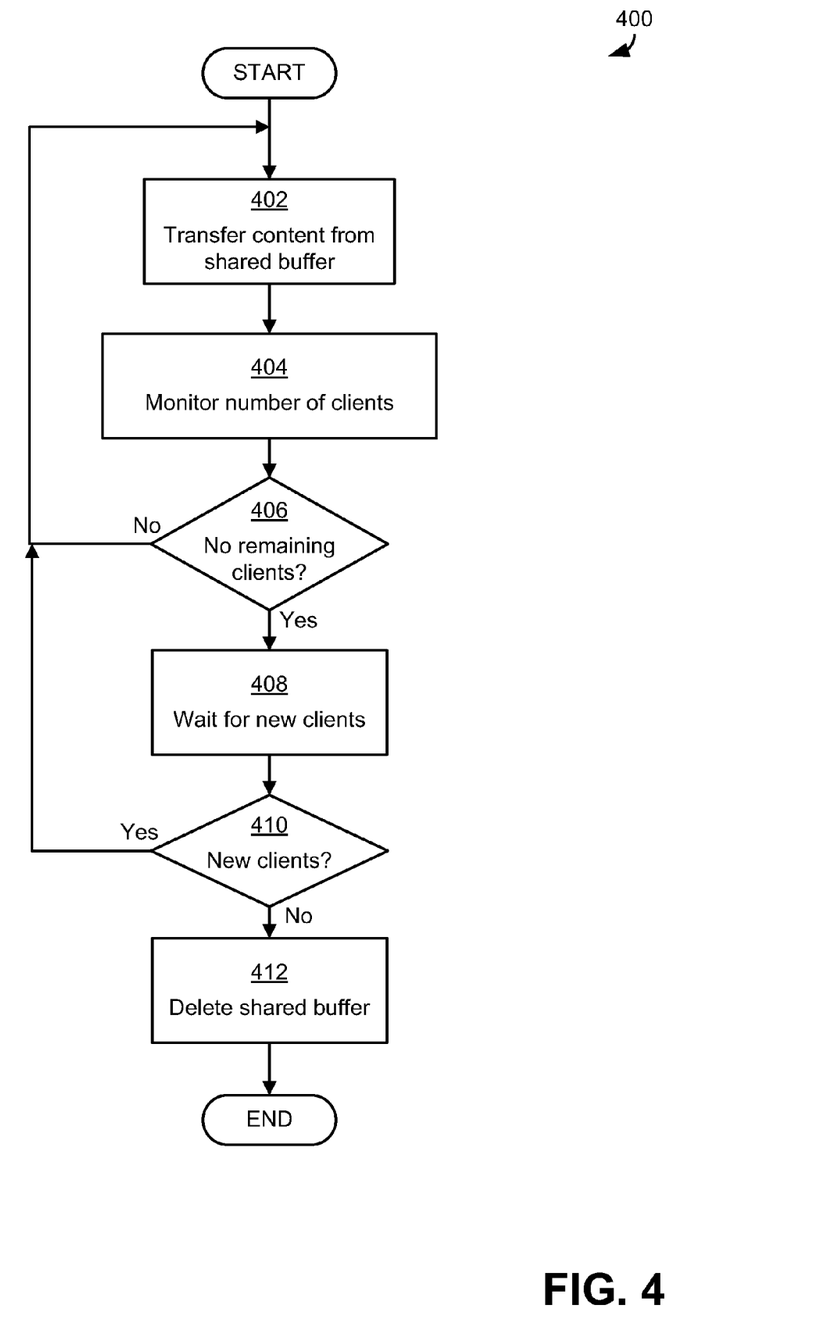
FIG. 4 is a flowchart of one exemplary process for determining whether to stop using a shared buffer for transferring content of a content unit to one or more clients.

FIG. 4 illustrates one example of a process that may be used in some embodiments to determine whether to stop using a shared buffer. In the example of FIG. 4, the server is configured to stop using a shared buffer upon determining that all clients that have requested that the file be transmitted have received the file. Embodiments are not limited, however, to determining whether to stop using a shared buffer based on a number of clients. Rather, any suitable conditions may be used.

Process 400 begins in block 402, in which content of a file is transmitted from a shared buffer to one or more clients. In block 404, the server monitors a number of clients to which content of the file is being transmitted. When a new client requests that content of the file being transmitted, the server may increment the number of clients and when the server completes transmitting the file to a client or the transfer ends for whatever reason, the server may decrement the number of clients.

In block 406, the server determines, based on the number of clients determined during the monitoring, whether any clients (of the clients who have requested that the file be transferred) to which to transfer content of the file remain. If more clients remain, then the server returns to block 402 to transmit content to clients using the shared buffer and monitor the number of clients in block 404.

If, however, in block 406 the server determines that no clients remain, then in block 408 the server may enter a waiting period. Any suitable waiting period may be used, as embodiments are not limited in this respect. During the waiting period, the server may monitor for new requests for the file from clients. If the server determines in block 410 that new clients have requested that the server transfer the file, then the server continues to block 402 to transmit content of the file to the new clients using the shared buffer. The server may continue to use the shared buffer in this manner because deleting the shared buffer and starting anew using individual buffers may use a great deal of resources that could be avoided while clients are still requesting that the file be transferred. Additionally, in some embodiments, like those operating with WDS, all clients may be requesting a copy of a same file (e.g., the network boot program (NBP) or an operating system image) and as such the server may continue using the shared buffer until all clients have received the file rather than flipping back and forth between individual buffers and shared buffers.

If, however, the server determines in block 410 that no new clients have requested the file during the waiting period, then in block 412 the server may delete the shared buffer and deallocate any resources (e.g., memory) associated with the shared buffer. The process 400 then ends. Following the process 400, when new clients request that the file that was previously buffered in the shared buffer be transferred, content of the file may be transferred using individual buffers. In some cases, if the server again determines (using the process 200 of FIG. 2 or another process) that a shared buffer should be used, the server may again transmit data using a shared buffer.

Described above are various techniques for transmitting content of a file (e.g., a file) stored on a server or accessible to a server to one or more clients. In many cases, when such processes are used, the file may not be modified during transmission. In some cases, however, a file could be modified during transfer of the file to one or more clients. In some embodiments, when a file is modified, the server may cease transmitting the file and restart the transmission with the new, modified file. In other embodiments, the server may continue transmitting the original, unmodified file to all clients to which the server is transferring the file when the server determines that the file has been modified, but may transmit the modified file to clients that request the file after the modification. When individual buffers are being used to transmit content of the file, the server may make any suitable decision regarding how to transfer content to each individual client or to new clients. When a shared buffer is being used at the time of the modification, however, the shared buffer stores the original, unmodified file. In some embodiments, the server may continue to use the shared buffer for active sessions at the time of the modification, but may use individual buffers with the modified file for new connections. In other embodiments, the server may use a process similar to FIG. 4 to determine when to stop using the shared buffer. In particular, in these embodiments, the server may stop using the shared buffer upon determining that no more clients remain for which content of a file in the shared buffer is to be transmitted.

Figure 5:
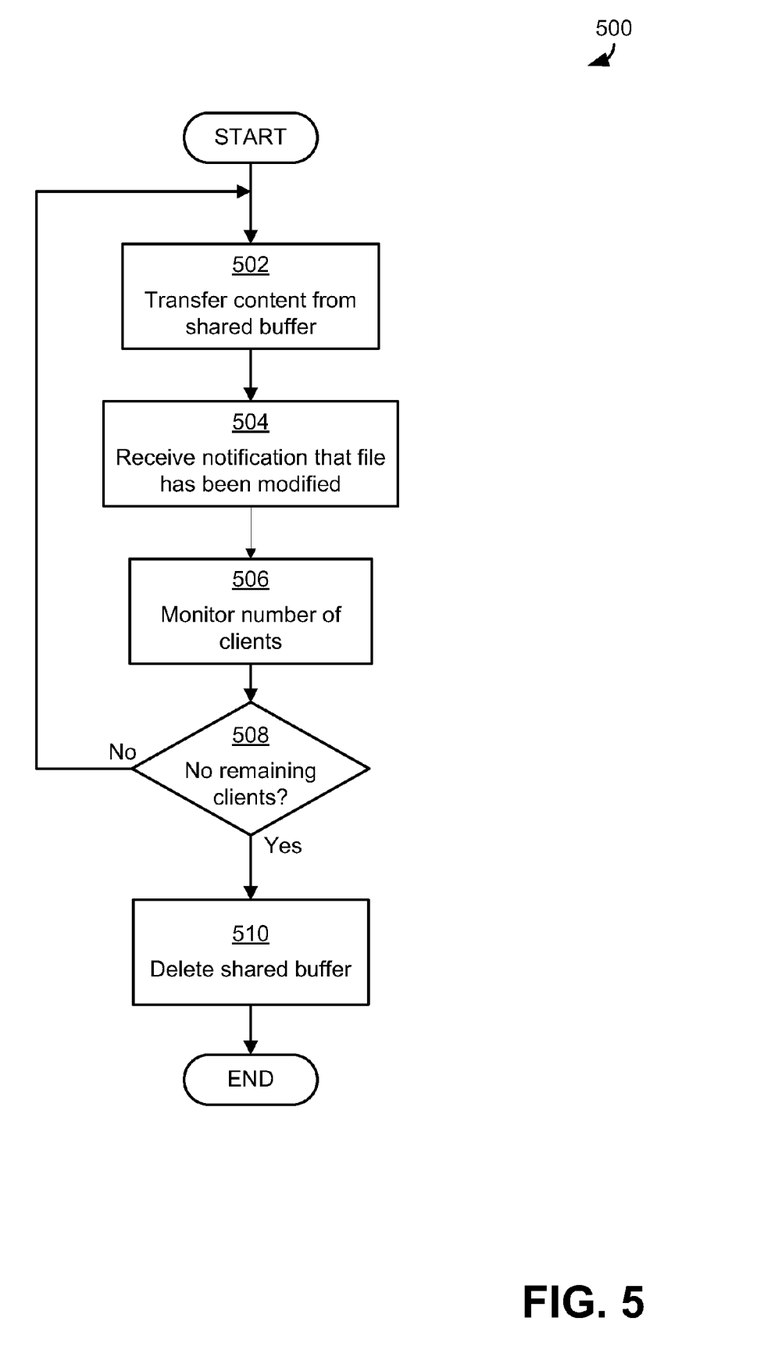
FIG. 5 is a flowchart of one exemplary process for determining whether to stop using a shared buffer for transferring content of a content unit to one or more clients when the content unit has been modified.

FIG. 5 illustrates one such process that may be used in some embodiments to determine when to stop using a shared buffer when the file of the shared buffer has been modified. The process 500 begins in block 502, in which content is transferred to one or more clients using a shared buffer. In block 504, the server receives a notification that the file of the shared buffer has been modified. The notification may be received from any suitable component, including from an operating system of the server or from a storage manager of a data store in which the file is stored. In some embodiments, a facility of the server may have registered to receive such a notification, while in other embodiments the facility of the server may receive the notification for each modified file.

In block 506, the server monitors a number of clients to which content of the file is being transmitted. When a new client requests that content of the file being transmitted, the server may increment the number of clients and when the server completes transmitting the file to a client or the transfer ends for whatever reason, the server may decrement the number of clients. In block 508, the server determines, based on the number of clients determined during the monitoring, whether any clients (of the clients who have requested that the file be transferred) to which to transfer content of the file remain. If more clients remain, then the server returns to block 502 to transmit content to clients using the shared buffer and monitor the number of clients in block 506.

If, however, in block 508 the server determines that no clients remain, then in block 510 the server may delete the shared buffer. This is different than in process 400 of FIG. 4, in which the server entered a waiting period following determining that no clients remain. In the case of FIG. 5, however, the file buffered in the shared buffer has been modified. To ensure that clients receive correct content the server is configured to delete the shared buffer immediately, rather than following a waiting period. Once the shared buffer is deleted in block 510, the process 500 ends.

While FIGS. 4 and 5 are illustrated and discussed separately, in some embodiments these processes may be used together or a process may be used that includes parts of both processes. For example, in FIG. 4, rather than entering the waiting period in block 408 upon detecting in block 406 that no more clients remain to which to transfer content, the server could determine whether a notification was received that the file was modified and, if so, delete the shared buffer. If no notification was received, then the process of FIG. 4 could continue as above, by entering the waiting period in block 408.

Techniques operating according to the principles described herein may be implemented in any suitable manner Included in the discussion above are a series of flow charts showing the steps and acts of various processes that enable use of shared buffers with connectionless content unit transfer protocols like TFTP. The processing and decision blocks of the flow charts above represent steps and acts that may be included in algorithms that carry out these various processes. Algorithms derived from these processes may be implemented as software integrated with and directing the operation of one or more multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit, or of any particular programming language or type of programming language. Rather, the flow charts illustrate the functional information one of ordinary skill in the art may use to fabricate circuits or to implement computer software algorithms to perform the processing of a particular apparatus carrying out the types of techniques described herein. It should also be appreciated that, unless otherwise indicated herein, the particular sequence of steps and acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, or any other suitable type of software. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations needed to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may form a part of a software package, for example as a part of a program that includes functionality to transfer content units (e.g., files) or as part of a program to carry out a variety of functions including transferring content, such as Windows Deployment Services (WDS) programs on a client or server. These functional facilities may, in alternative embodiments, be adapted to interact with other, unrelated functional facilities and/or processes, to implement a software program application. In other implementations, the functional facilities may be adapted to interact with other functional facilities in such a way as form an operating system, including the Windows° operating system, available from the Microsoft° Corporation of Redmond, Wash. In other words, in some implementations, the functional facilities may be implemented alternatively as a portion of or outside of an operating system.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 606 of FIG. 6 described below (i.e., as a portion of a computing device) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

In some, but not all, implementations in which the techniques may be embodied as computer-executable instructions, these instructions may be executed on one or more suitable computing device(s) operating in any suitable computer system, including the exemplary computer system of FIG. 1. Functional facilities that comprise these computer-executable instructions may be integrated with and direct the operation of a single multi-purpose programmable digital computer apparatus, a coordinated system of two or more multi-purpose computer apparatuses sharing processing power and jointly carrying out the techniques described herein, a single computer apparatus or coordinated system of computer apparatuses (co-located or geographically distributed) dedicated to executing the techniques described herein, one or more Field-Programmable Gate Arrays (FPGAs) for carrying out the techniques described herein, or any other suitable system.

Figure 6:
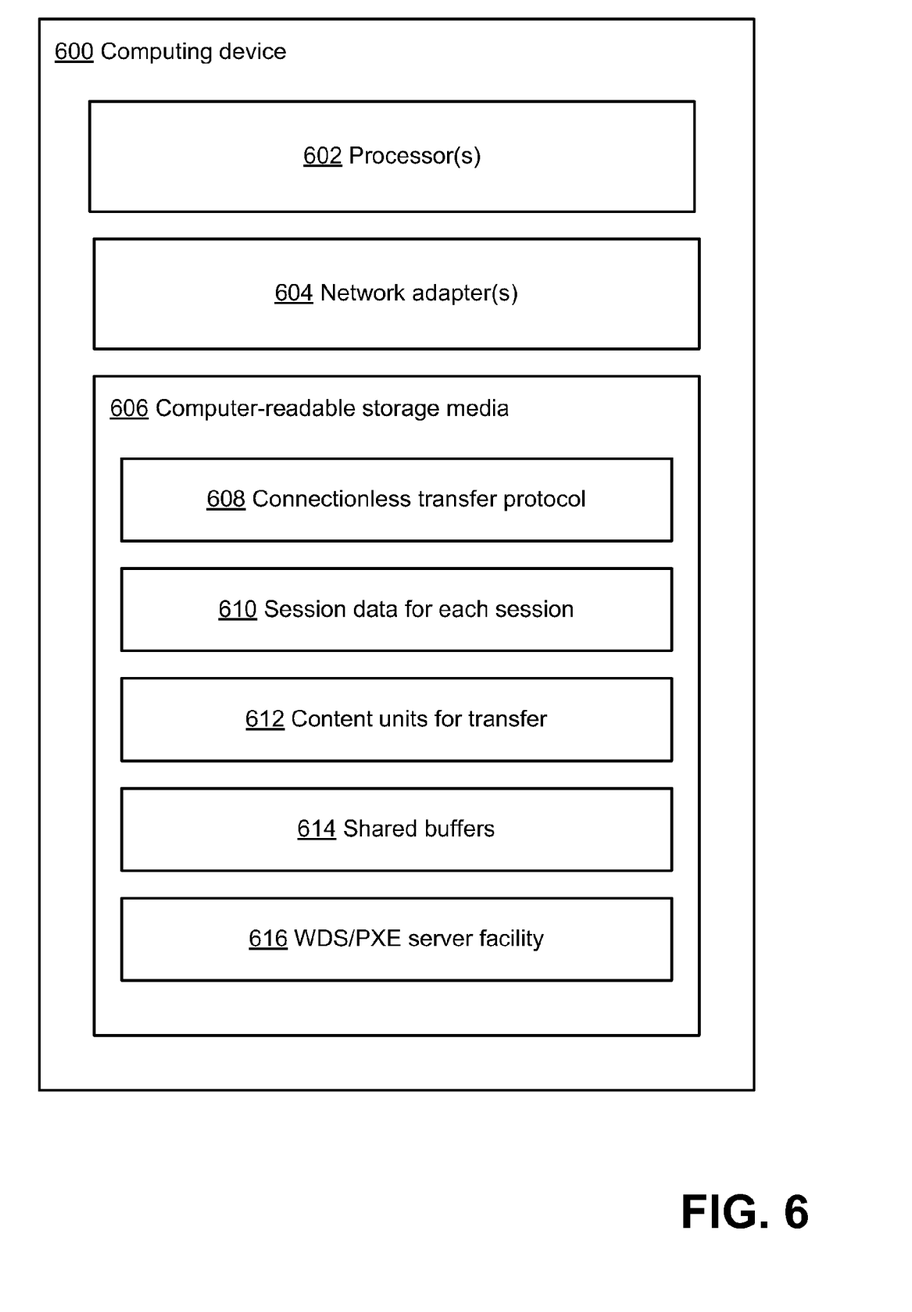
FIG. 6 is a block diagram of one exemplary computing device with which some embodiments may operate.

FIG. 6 illustrates exemplary implementations of computing device in the form of a computing device 600 that may be used in a system implementing the techniques described herein, although others are possible. It should be appreciated that FIG. 6 is intended neither to be depictions of necessary components for a computing device to operate in accordance with the principles described herein, nor comprehensive depictions.

FIG. 6 illustrates one exemplary computing device that may be used as a server in accordance with techniques described herein. A server, in this context, does not refer to any particular type of computing device, but rather refers to a device that may be a source of a content unit to be transferred to a destination.

Computing device 600 may comprise at least one processor 602, a network adapter 604, and computer-readable storage media 606. Computing device 600 may be, for example, a desktop or laptop personal computer, a personal digital assistant (PDA), a smart mobile phone, a wireless access point or other networking element, a resource-heavy device that may typically be used as a server, or any other suitable computing device. Network adapter 604 may be any suitable hardware and/or software to enable the computing device 600 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 606 may be adapted to store data to be processed and/or instructions to be executed by processor 602. Processor 602 enables processing of data and execution of instructions. The data and instructions may be stored on the computer-readable storage media 606 and may, for example, enable communication between components of the computing device 600.

The data and instructions stored on computer-readable storage media 606 may comprise computer-executable instructions implementing techniques which operate according to the principles described herein. In the example of FIG. 6, computer-readable storage media 606 stores computer-executable instructions implementing various facilities and storing various information as described above. Computer-readable storage media 606 may store a facility 608 that implements a connectionless content unit transfer protocol that may use shared buffers, in accordance with at least some of the principles described herein and that may implement none, some, or all of the exemplary techniques described above. Session data for each session, including information regarding which content has been transferred to a client, an individual buffer for each session, and/or timers for each session may also be maintained. The computer-readable storage media 606 may also store content units 612 that can be transferred to a client using the facility 608. Additionally, the computer-readable storage media 606 may store one or more shared buffers 614 for transferring content to clients that are requesting one or more files. Lastly, in some embodiments the computer-readable storage media 606 may include a WDS/PXE server facility 616 that implements server functionality of WDS and/or PXE, as in some embodiments techniques described herein may be used to transfer operating system files.

While not illustrated in FIG. 6, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A method for distributing a content unit from a server computing device to a plurality of clients, the method comprising:
   receiving, by the server computing device, a plurality of requests from the plurality of clients to transfer the content unit using Trivial File Transfer Protocol (TFTP);
   beginning transmission, by the server computing device, of the content unit to each client of the plurality of clients from separate buffers of a plurality of buffers using the TFTP, wherein each separate buffer is associated with a particular client;
   determining that an aggregate size of the plurality of separate buffers is greater than a threshold that is based on a size of the content unit;
   in response to determining that the aggregate size of the plurality of separate buffers is greater than a threshold, establishing a shared buffer with at least a portion of the content unit that was contained in at least one of the separate buffers; and
   continuing transmission, by the server computing device, of the content unit to each client of the plurality of clients from the shared buffer using the TFTP.

2. The method of claim 1, wherein at least one of the plurality of clients is an unauthenticated client.

3. The method of claim 2, wherein the TFTP is employed without congestion control.

4. The method of claim 1, wherein beginning transmission of the content unit comprises:
   removing data transmitted to a first client from a first buffer of the plurality of buffers; and
   inserting data that has yet to be transmitted to the first client to the first buffer.

5. The method of claim 4, wherein establishing the shared buffer comprises:
   adding additional data that has yet to be transmitted to the first client to the shared buffer; and
   wherein continuing transmission of the content unit comprises:
   transmitting the additional data to the first client from the shared buffer; and transmitting the additional data to a second client from the shared buffer.

6. The method of claim 1, further comprising, following determining that the aggregate size of the plurality of separate buffers is greater than the threshold:
receiving a new request from a new client, different from the plurality of clients; and
transferring content of the content unit to the new client from the shared buffer.

7. The method of claim 1, further comprising, following determining that the aggregate size of the plurality of separate buffers is greater than the threshold:
determining that the content unit has been transferred to each client that requested the content unit; and deleting data stored in the shared buffer if the server computing device does not receive another request for the content unit within a waiting period.

8. The method of claim 7, further comprising:
retaining the data stored in the shared buffer if the server computing device receives another request for the content unit within a waiting period.

9. The method of claim 7, further comprising, following determining that the aggregate size of the plurality of separate buffers is greater than the threshold:
determining that the content unit has been modified; and
deleting the shared buffer without delaying for the waiting period after in-progress transmissions of the content are finished.

10. At least one computer-readable memory storing computer-executable instructions for causing a computer to perform operations that include:
receiving, at the computer, a plurality of requests from a plurality of clients for the computer to provide a file via Trivial File Transfer Protocol (TFTP);
beginning TFTP transmission of the file to each client of the plurality of clients from separate buffers of a plurality of separate buffers, wherein each separate buffer is associated with a particular client;
determining that an aggregate size of the plurality of separate buffers has reached a threshold relative to a size of the file;
in response to determining that the aggregate size of the plurality of separate buffers has reached the threshold, transferring at least a portion of the file into a shared buffer; and
continuing TFTP transmission of the file to each client of the plurality of clients from the shared buffer.

11. The at least one computer-readable memory of claim 10, wherein beginning transmission of the file comprises:
removing a first block of data that has been transmitted to a first client from a first buffer; and
inserting into the first buffer a second block of data that has not yet been transmitted to the first client.

12. The at least one computer-readable memory of claim 11, wherein transferring at least a portion of the file into a shared buffer comprises:
adding a third block of data to be transferred to the first client to the shared buffer; and wherein continuing transmission of the content unit comprises:
transmitting the third block of data to the first client from the shared buffer; and
transmitting the third block of data to a second client from the shared buffer.

13. The at least one computer-readable memory of claim 10, wherein the operations further comprise:
determining that the file has been transferred to each client that requested the file; and deleting at least the portion of the file from the shared buffer if another request for the file is not received by the computer during a waiting period.

14. The at least one computer-readable memory of claim 13, wherein the operations further comprise:
determining that the content unit has been modified; and
deleting the shared buffer without delaying the waiting period after completion of pending transmissions.

15. An server apparatus for distributing files to a plurality of clients, comprising:
a memory and at least one processor that are respectively configured to store and execute instructions that:
receive a plurality of requests from clients of the plurality of clients for the server apparatus to transfer a file using Trivial File Transfer Protocol (TFTP);
begin to TFTP transfer the file to each client of the plurality of clients from separate buffers of a plurality of separate buffers, each buffer being associated with a particular client of the plurality of clients;
determine that a total memory used by the plurality of separate buffers has risen to a threshold; and
in response to the determination that the total memory used by the plurality of separate buffers has risen to a threshold;
establish a shared buffer; and
continue to TFTP transfer the file to each client of the plurality of clients from the shared buffer.

16. The server apparatus of claim 15, wherein the memory and the at least one processor are further configured to store and execute instructions that:
receive another request from another client; and
transfer the file to the other client from the shared buffer.

17. The server apparatus of claim 15, wherein the memory and the at least one processor are further configured to store and execute instructions that:
determine that the file has been transferred to all clients that requested the file; and
delete the shared buffer after a waiting period during which the server apparatus does not receive another request for the file.

18. The server apparatus of claim 15, wherein the memory and the at least one processor are further configured to store and execute instructions that:
determine that the file has been modified; and
in response to the determination that the file has been modified, delete data in the shared buffer.

* * * * *